United States Patent Office 3,514,464
Patented May 26, 1970

3,514,464
5-OXO-1,2,3,4-TETRAHYDRO-5H-[1]BENZO-
PYRANO[3,4-c]PYRIDINES
Harry G. Pars, Lexington, Felix E. Granchelli, Arlington, and Raj K. Razdan, Belmont, Mass., assignors, by mesne assignments, to Arthur D. Little, Inc., Cambridge, Mass., a corporation of Massachusetts
No Drawing. Filed May 29, 1967, Ser. No. 642,223
Int. Cl. C07d 31/34
U.S. Cl. 260—295          7 Claims

ABSTRACT OF THE DISCLOSURE

A new series of 5 - oxo - 1,2,3,4 - tetrahydro - 5H-[1]benzopyrano[3,4 - c]pyridines used as intermediates in the preparation of 1,2,3,4-tetrahydro-5H[1] - benzopyrano[3,4-c]pyridines and 5H - [1]benzopyranol[3,4-c]piperidines which have C.N.S. and cardiovascular activity.

This invention relates to novel chemical compositions of matter known in the art of chemistry as 1,2,3,4-tetrahydro - 5H - [1]benzopyrano[3,4-c]pyridines and 5H-[1]benzopyrano[3,4-c]-piperidines having the Formulas Ia, b and IIa, b, respectively:

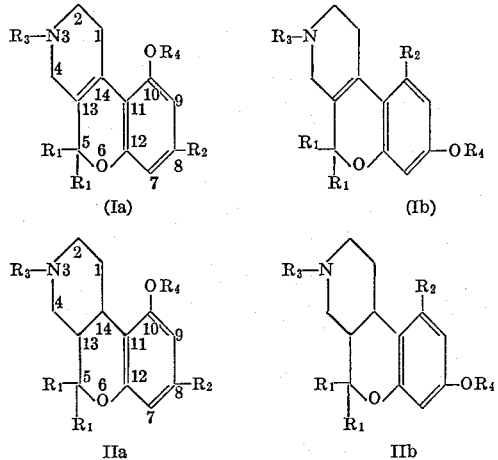

and to 5 - oxo - 1,2,3,4 - tetrahydro-5H-[1]benzopyrano [3,4-c]pyridines, useful as intermediates for the preparation of the compounds of Formulas Ia, b and IIa, b, and having the Formulas IIIa, b:

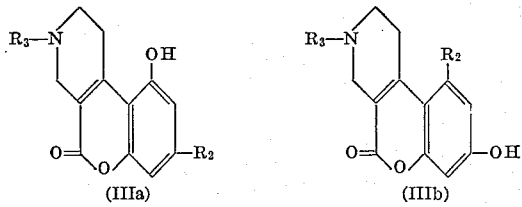

In the compounds of Formulas Ia, b; IIa, b; and IIIa, b above, $R_1$ is lower-alkyl; $R_2$ is methyl or 3-methyl-2-octyl; $R_3$ is a member of the group consisting of hydrogen, lower alkyl, lower-alkanoyl, cycloalkyl-lower-alkyl, cycloalkyl-lower-alkanoyl, lower-alkenyl, lower-alkynyl, halo-lower-alkenyl (including fluoro-, chloro-, bromo-, and iodo-lower-alkenyl), phenyl-lower-alkyl, phenyl-lower-alkanoyl, phenyl-lower-alkenyl, and phenyl-lower-alkynyl; and $R_4$ is hydrogen, lower alkyl, lower-alkanoyl, carbamyl, N-lower-alkylcarbamyl, N,N - di - lower-alkylcarbamyl, or phosphonyl, $R_2$ being methyl only when $R_3$ is hydrogen, lower alkanoyl, cycloalkyl-lower alkyl, cycloalkyl lower-alkanol, lower-alkenyl, lower-alkynyl, halo-lower-alkenyl, phenyl-lower-alkyl, phenyl-lower-alkanoyl, phenyl-lower alkenyl, or phenyl-lower-alkenyl.

As used herein, the term "lower-alkyl" means saturated, monovalent aliphatic radicals, including straight or branched chain radicals of from one to six carbon atoms, as illustrated by, but limited to methyl, ethyl, propyl, isopropyl, butyl, sec.-butyl, amyl, hexyl, and the like.

As used herein, the term "lower-alkenyl" means monovalent, aliphatic radicals of from three to seven carbon atoms which contain at least one double bond, and are either straight or branched-chain, as illustrated by, but not limited to 1-(2-propenyl), 1-(3-methyl-2-propenyl), 1-(1,3-dimethyl-2-propenyl), 1-(2-hexenyl), and the like.

As used herein, the term "lower-alkynyl" means monovalent, aliphatic radicals, of from three to seven carbon atoms which contain at least one triple bond, and are either straight or branched-chain, as illustrated by, but not limited to 1-(2-propynyl), 1-(1-methyl-2-propynyl), 1-(2-heptynyl), and the like.

As used herein, the term "cycloalkyl" means cyclic, saturated aliphatic radicals of from three to eight carbon atoms, as illustrated by, but not limited to cyclopropyl, cyclobutyl, 2-methylcyclobutyl, cyclohexyl, 4-methylcyclohexyl, cyclooctyl, and the like.

As used herein, the term "lower-alkanoyl" means saturated, monovalent, aliphatic radicals derived from a mono-carboxylic acid, including straight or branched-chain radicals of from one to six carbon atoms, as illustrated by, but not limited to formyl, acetyl, propionyl, α-methylpropionyl, butyryl, hexanoyl, and the like .

As used herein, the terms "phenyl-lower-alkyl," "phenyl-lower-alkanoyl," "phenyl-lower-alkenyl," and "phenyl-lower alkynyl" mean a monovalent radical consisting of a phenyl nucleus bonded to the rest of the molecule through, respectively, a divalent lower-alkylene radical of from one to four carbon atoms as illustrated by, but not limited to methylene, 1,1-ethylene, 1,2-ethylene, 1,3-propylene, 1,2-propylene, 1,4-butylene and the like or through a divalent lower-alkenylene radical of from two or four carbon atoms, as illustrated by, but not limited to 1,2-ethenylene, 1,3-(1-propenylene), 1,3-(1-butenylene), 1,4-(2-butenylene), and the like, or through a divalent lower-alkynylene radical of from two to four carbon atoms, as illustrated by but not limited to 1,2-ethynylene, 1,3-propynylene, 1,3-(1-butynylene), and the like. Here and elsewhere throughout this specification, it will be understood the benzene ring of phenyl can bear any number and kind of substituents such as would occur to the man skilled in the organic chemistry. Solely for illustration, and without limitation, such substiuents include lower-alkyl, lower-alkoxy, halo(chloro, bromo, iodo, or fluoro), nitro, lower-alkylmercapto, and the like.

The compounds of Formulas Ia, b where $R_4$ is hydrogen are prepared by reacting an 8 - alkyl-10-hydroxy-5-oxo - 1,2,3,4-tetrahydro - 5H - [1]benzopyrano[3,4-c] pyridine or a 10 - alkyl - 8 - hydroxy-5-oxo-1,2,3,4-tetrahydro-5-H-[1]benzopyrano[3,4-c]pyridine, having the respective Formulas IIIa and IIIb, with a lower-alkyl magnesium halide as illustrated by the equation:

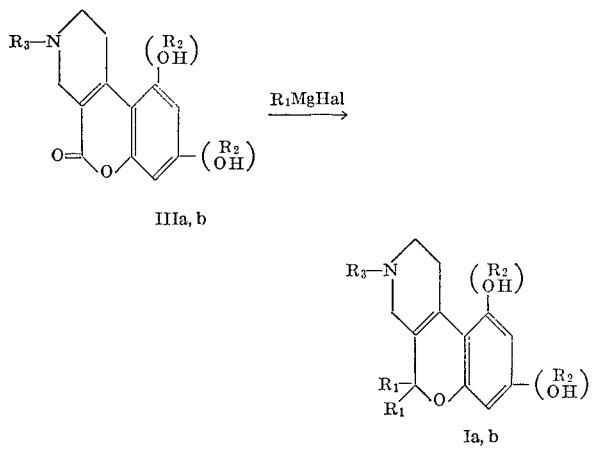

where $R_1$, $R_2$, and $R_3$ have the meanings given hereinabove, and Hal represents halogen. The reaction is carried out in an organic solvent inert under the conditions of the reaction. Suitable solvents are diethyl ether, dibutyl ether, tetrahydrofuran, anisole, pyridine, and the like. It is preferred to add a solution of the 8-alkyl-10-hydroxy-5 - oxo - 1,2,3,4 - tetrahydro-5H-[1]benzopyrano[3,4-c]pyridine or 10 - alkyl - 8 - hydroxy-5-oxo-1,2,3,4-tetrahydro - 5H - [1]benzopyrano[3,4-c]]pyridine in a pyridine or anisole solution, or in a mixture of these solvents, to a solution of the Grignard reagent in anisole.

The compounds of Formulas IIIa, b in turn are prepared by reacting a $1-R_3-3$ - carbo-lower-alkoxy-4-piperidone of Formula IV with a 5-alkylresorcinol of Formula V. The reaction is carried out in a mixture of concentrated sulfuric acid and phosphorus oxychloride or in the presence of other acidic condensation agents such as aluminum chloride, hydrogen chloride, or polyphosphoric acid and is illustrated by the equation:

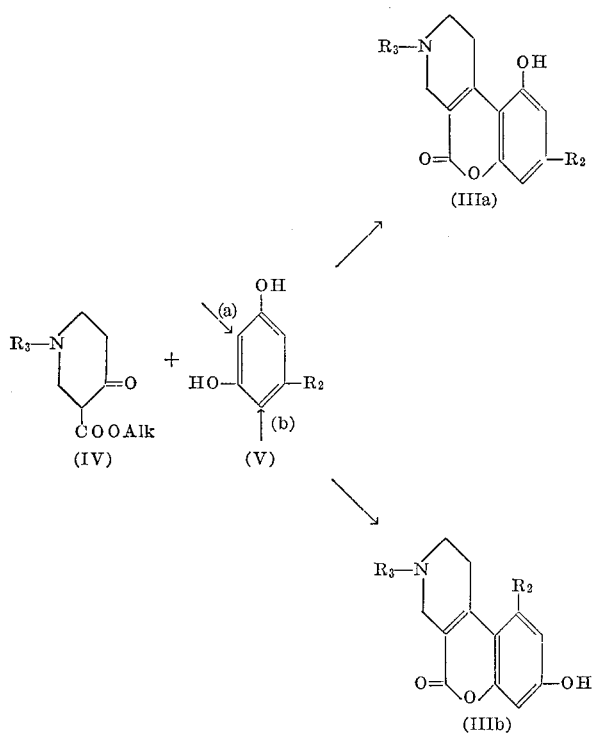

where $R_2$ and $R_3$ are defined as above, and Alk is lower-alkyl.

As indicated by the reaction scheme above, the ring closure of the 1-$R_3$-3-carbo-lower-alkoxy-4-piperidone with the 5-alkylresorcinol can take place either by cyclization at the 2-position of the 5-alkylresorcinol, as indicated by the arrow (a), to produce the 8 - alkyl - 10 - hydroxy-5-oxo - 1,2,3,4 - tetrahydro-5H-[1]benzopyrano[3,4-c]pyridines of Formula IIIa or by cyclization at the 4-position of the 5-alkylresorcinol, as indicated by the arrow (b), to produce the 10-alkyl-8-hydroxy-5-oxo-1,2,3,4-tetrahydro-5H-[1]benzopyrano[3,4-c]pyridines of Formula IIIb. Generally either the compounds of Formula IIIa or of Formula IIIb are produced by either 5-methylresorcinol ($R_2$ is $CH_3$) or by 5 - (3 - methyl-2-octyl)resorcinol ($R_2$ is $CHCH_3CHCH_3C_5H_{11}$), but in the latter case, the predominant products are the compounds of Formula IIIa owing to the partial steric hindrance of the 4-position of the resorcinol by the rather bulky 3-methyl-2-octyl group in the adjacent 5-position which inhibits cyclization at the 4-position.

The intermediate 5-methyl- and 5-(3-methyl-2-octyl)-resorcinols of Formula V are known in the art.

The intermediate 1-$R_3$-carbo-lower-alkoxy-4-piperidones of Formula IV are prepared by the method of Prill and McElvain, J. Am. Chem. Soc. 55, 1233(1933) and of McElvain and Vozza, J. Am. Chem. Soc. 71, 896(1948).

The compounds of Formulas Ia and Ib where $R_3$ is hydrogen are also advantageously prepared by catalytically debenzylating, with hydrogen in the presence of a catalyst, the compounds of Formulas Ia, b hereinabove where $R_3$ is benzyl. The reaction is preferably carried out in an organic solvent inert under the conditions of the reaction, for example methanol, ethanol, isopropanol, and the like. Suitable catalysts are platinum or palladium-on-charcoal. A preferred catalyst is palladium-on-charcoal.

The compounds of Formulas Ia, b or IIa, b, where $R_3$ is cycloalkyl-lower-alkyl, lower-alkenyl, lower-alkynyl, halo-lower-alkenyl, phenyl-lower-alkyl, phenyl-lower-alkenyl, or phenyl-lower-alkynyl are prepared by reacting the corresponding compounds of Formulas Ia, b or IIa, b, where $R_3$ is hydrogen with a cycloalkyl-lower-alkyl, lower-alkenyl, lower-alkynyl, halo-lower alkenyl, phenyl-lower-alkyl, phenyl-lower-alkenyl, or phenyl-lower-alkynyl halide, respectively. The reaction is preferably carried out in an organic solvent inert under the conditions of the reaction, for example methanol, ethanol, isopropanol, or dimethylformamide, and in the presence of an acid-acceptor. The purpose of the acid-acceptor is to take up the hydrogen halide split out during the course of the reaction and is a basic substance which forms water-soluble salts readily separable from the reaction mixture. Suitable acid-acceptors are alkali metal carbonates or bicarbonates, for example sodium or potassium carbonate, or bicarbonate, or alkali metal hydroxides, for example sodium or potassium hydroxide. The reaction can also be carried out in the presence of a molar excess of the bases of Formulas Ia, b or IIa, b where $R_3$ is hydrogen. A preferred acid-acceptor is sodium carbonate, and a preferred solvent is ethanol.

The compounds of Formulas Ia, b or IIa, b where $R_3$ is lower-alkanoyl, cycloalkyl-lower-alkanoyl, or phenyl-lower-alkanoyl are prepared by reacting the corresponding compounds of Formulas Ia, b or IIa, b where $R_3$ is hydrogen with an acid halide or anhydride of a lower-alkanoic, cycloalkyl-lower-alkanoic, or phenyl-lower-alkanoic acid, respectively. The reaction is preferably carried out in an organic solvent inert under the conditions of the reaction, for example benzene, toluene, xylene, and the like, and in the presence of a basic catalyst, for example pyridine, triethylamine, dimethylaniline, and the like. A preferred solvent is benzene, and a preferred basic catalyst is pyridine.

The compounds of Formulas Ia, b or IIa, b where $R_3$ is cycloalkyl-lower-alkyl and phenyl-lower-alkyl can also be prepared by reducing, with an alkali metal aluminum hydride, the compounds of Formulas Ia, b or IIa, b where $R_3$ is cycloalkyl-lower-alkanoyl or phenyl-lower-alkanoyl, respectively, and where $R_4$ is hydrogen or lower-alkyl.

The reaction is preferably carried out in an organic solvent inert under the conditions of the reaction, for example diethyl ether, tetrahydrofuran, dibutyl ether, and the like.

The 8-alkyl-10-hydroxy-5,5-di-lower-alkyl-5H-[1]benzopyrano[3,4-c]piperidines and 10-alkyl-8-hydroxy-5,5-di-lower - alkyl - 5H -[1]benzopyrano[3,4-c]piperidines of Formulas IIa and IIb, respectively, are prepared by reducing with hydrogen over a suitable catalyst the 8 - alkyl - 10 - hydroxy - 5,5 - di-lower-alkyl-1,2,3,4-tetrahydro-5H-[1]benzopyrano[3,4-c]pyridines and 10-alkyl-8 - hydroxy - 5,5 - di - lower - alkyl-1,2,3,4-tetrahydro-5H-[1]benzopyrano[3,4-c]pyridines of Formulas Ia and Ib, respectively, where $R_1$, $R_2$, and $R_4$ have the meanings given above and $R_3$ is hydrogen, lower-alkyl, lower-alkanoyl, cycloalkyl-lower-alkyl, cycloalkyl-lower-alkanoyl, phenyl-lower-alkanoyl, or phenyl-lower-alkyl. The reaction is carried out in an organic solvent inert under the conditions of the reaction, for example methanol, ethanol, isopropanol, and the like. Suitable catalysts include palladium-on-charcoal, platinum, Raney nickel, and the like. A preferred catalyst is Raney nickel.

The ester and ether derivatives of the compounds of Formulas Ia, b and IIa, b, that is the compounds where $R_4$ is lower-alkyl, lower-alkanoyl, carbamyl, N-lower-alkylcarbamyl, N,N-di-lower-alkylcarbamyl, or phosphonyl are prepared by reacting the corresponding compounds where $R_4$ is hydrogen, preferably in the presence of a basic catalyst, with a lower-alkyl halide, to produce the compounds where $R_4$ is lower-alkyl; with a lower-ankanoic anhydride (or mixed anhydride), to produce the compounds where $R_4$ is lower-alkanoyl; with a molar equivalent of phosgene followed by reaction of the resulting chloroformate with ammonia, a lower-alkylamine, or a di-lower-alkylamine, to produce the compounds where $R_4$ is, respectively, carbamyl, N-lower-alkylcarbamyl, or N,N-di-lower-alkylcarbamyl; or with one molar equivalent amount of phosphorus oxychloride followed by reaction of the resulting dichlorophosphinate with aqueous sodium or potassium carbonate, to produce the compounds where $R_4$ is phosphonyl. Suitable solvents are benzene, toluene, xylene, and the like, and suitable basic catalysts are alkali metal carbonates, bicarbonates, or hydroxides, dimethylaniline, pyridine, and the like.

The acid-addition salts of the bases herein described are the form in which the bases are most conveniently prepared for use and are the full equivalents of the subject matter specifically claimed. The acid moieties or anions in these salt forms are in themselves neither novel nor critical and therefore can be any acid anion or acid-like substance capable of salt formation with the free base form of the compounds. The preferred type of salts are water-soluble pharmacologically-acceptable salts, that is, salts whose anions are relatively innocuous to the animal organisms in pharmacological doses of the salts, so that the beneficial physiological properties inherent in the free base are not vitiated by side effects ascribable to the anions; in other words, the latter do not substantially affect the pharmacological properties inherent in the cations. In practicing the invention, it has been found convenient to form the hydrochloride salt. However, other appropriate pharmacologically-acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate, and quinate, respectively.

Although pharmacologically-acceptable salts are preferred, those having toxic anions are also useful. All acid-addition salts are useful intermediates as sources of the free base form even if the particular salt per se is not desired as the final product, as for example when the salt is formed only for purposes of purification or identification, or when it is used as an intermediate in preparing a pharmacologically-acceptable salt of ion-exchanging procedures.

The compounds of Formulas Ia, b and IIa, b have been shown to possess C.N.S. and cardiovascular activity as evidenced by gross overt changes induced by intravenous administration in mice in standard tests involving observations of psychomotor activity, reactivity to stimuli, and ability to perform normal, non-conditioned motor tasks. This activity indicates their usefulness as psychotropic agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further, the compounds can be formulated for oral administration in aqueous alcohol, glycol, or oil solutions or oil-water emulsions in the same manner as conventional medicinal substances are prepared.

The molecular structures of the compounds of our invention were assigned on the basis of study of their infrared, ultraviolet, and NMR spectra and their transformation products, and confirmed by the correspondence between calculated and found values for the elementary analyses for representative examples.

The following examples will further illustrate the invention without, however, limiting it thereto.

EXAMPLE 1

10-hydroxy-8-(3-methyl-2-octyl)-3,5,5-trimethyl-1,2,3,4-tetrahydro-5H-[1]benzopyrano[3,4-c]pyridine (A) 10 - hydroxy - 5 - oxo - 3 - methyl - 8 - (3 - methyl - 2 - octyl) - 1,2,3,4 - tetrahydro - 5H - [1]benzopyrano [3,4-c]pyridine. — 1 - methyl - 3 - carbethoxy - 4 - piperidone hydrochloride, (42 g., 0.19 mole) was added in portions to 27.8 g. (0.12 mole) of 5-(3-methyl-2-octyl) resorcinol with stirring, and 48 ml. of concentrated sulfuric acid was then added dropwise to the mixture at room temperature. The mixture was then treated with 21 ml. of phosphorus oxychloride, stirred at room temperature for seventy-eight hours, neutralized with aqueous potassium bicarbonate, and the product extracted into chloroform. The organic extracts were washed first with bicarbonate solution and then with water, dried over anhydrous sodium sulfate, and taken to dryness. The crude product (44 g.) was extracted with five 350 ml. portions of boiling acetonitrile, and from the fifth extract there was obtained 7.3 g. of 10-hydrovy-5-oxo-3-methyl-8-(3-methyl - 2 - octyl) - 1,2,3,4 - tetrahydro - 5H - [1]benzopyrano [3,4-c]pyridine, M.P. 169,173° C.

(B) 10 - hydroxy - 8 - (3 - methyl - 2 - octyl) - 3,5,5-trimethyl - 1,2,3,4 - tetrahydro - 5H - [1]benzopyrano [3,4-c]pyridine.—A solution of 3.5 g. (0.01 mole) of 10-hydroxy - 5 - oxo - 3 - methyl - 8 - (3 - methyl - 2 - octyl)-1,2,3,4 - tetrahydro - 5H - [1]benzopyrano[3,4-c]pyridine, dissolved in 65 ml. of pyridine, was added dropwise to a solution of 0.1 mole of methyl magnesium iodide in 100 ml. of anisole. When addition was complete, the mixture was stirred at 30–45° C. for about eight hours, cooled, and the excess Grignard reagent decomposed with 100 ml. of water. The mixture was then acidified with 300 ml. of 4 N sulfuric acid, and steam distilled to remove the anisole. The aqueous residue was then basified by the addition of solid sodium carbonate, and the pyridine removed by steam distillation. The solid which separated from the cooled reaction mixture was collected and dried giving 3.36 g. of the product in free base form. The latter was converted to the hydrochloride salt in ethyl acetate and recrystallized from acetonitrile giving 1.4 g. of 10 - hydroxy - 8 - (3 - methyl - 2 - octyl) - 3,5,5 - trimethyl - 1,2,3,4 - tetrahydro - 5H - [1]benzopyrano[3,4-c]pyridine hydrochloride, M.P. 281–293° C.

*Analysis.*—Calcd. for $C_{24}H_{37}NO_2 \cdot HCl$ (percent): C, 70.65; H, 9.39; N, 3.43. Found (percent): C, 71.07; H, 9.45; N, 3.42.

EXAMPLE 2

5,5-dimethyl-10-hydroxy-8-(3-methyl-2-octyl)-1,2,3,4-tetrahydro-5H-[1]benzopyrano[3,4-c]pyridine (A) 3 - benzyl - 10 - hydroxy - 8 - (3 - methyl - 2- octyl) - 5 - oxo - 1,2,3,4 - tetrahydro - 5H - [1]benzopyrano[3,4-c]pyridine hydrochloride. — 1 - benzyl - 3-carbethoxy - 4 - piperidone hydrochloride, (11 g., 0.037 mole) was added in portions to 10.2 g. (0.041 mole) of 5-(3-methyl-2-octyl)resorcinol with stirring, and the mixture was then treated dropwise with cooling with 22 ml. of concentrated sulfuric acid. When addition was complete, 6 ml. of phosphorus oxychloride was added all at once, and the mixture stirred for sixteen hours at room temperature. Isolation of the product in the form of its hydrochloride salt and recrystallization from acetonitrile gave 6.5 g. of 3-benzyl-10-hydroxy-8-(3-methyl-2-octyl)-5 - oxo - 1,2,3,4 - tetrahydro - 5H - [1]benzopyrano[3,4-c]pyridine hydrochlaoride, M.P. 236–240° C.

*Analysis.*—Calcd. for $C_{28}H_{35}NO_3 \cdot HCl$ (percent): C, 71.55; H, 7.50; N, 2.97. Found (percent): C, 71.29; H, 7.74; N, 2.96.

(B) 3-benzyl-5,5-dimethyl-10-hydroxy - 8 - (3-methyl-2-octyl)-1,2,3,4-tetrahydro - 5H - [1]benzopyrano[3,4-c]pyridine hydrochloride was prepared from 11.5 g. (0.026 mole) of 3 - benzyl-10-hydroxy-8-(3-methyl-2-octyl)-5- oxo - 1,2,3,4 - tetrahydro-5H-[1]benzopyrano[3,4-c]pyridine hydrochloride and 0.24 mole of methyl magnesium iodide in anisole using the procedure described above in Example 1-B. The crude product, isolated in the form of the hydrochloride salt, was recrystallized from ethyl acetate giving 2.9 g. of 3-benzyl-5,5-dimethyl-10-hydroxy-8-(3-methyl - 2 - octyl)-1,2,3,4-tetrahydro-5H-[1]benzopyrano[3,4-c]pyridine hydrochloride, M.P. 149–152° C.

*Analysis.*—Calcd. for $C_{30}H_{41}NO_2 \cdot HCl$ (percent): C, 74.43; H. 8.74; N, 2.89. Found (percent): C, 73.56; H, 8.89; N, 2.83.

(C) 5,5-dimethyl - 10 - hydroxy-8-(3-methyl-2-octyl)-1,2,3,4 - tetrahydro - 5H - [1]benzopyrano[3,4-c]pyridine.—A solution of 10 g. (0.024 mole) of 3-benzyl-5,5-dimethyl-10-hydroxy-8-(3-methyl - 2 - octyl) - 1,2,3,4 - tetrahydro-5H-[1]benzopyrano[3,4-c]pyridine, dissolved in 150 ml. of absolute ethanol and 30 ml. of glacial acetic acid, was reduced with hydrogen at 45.5 pounds p.s.i. over 0.7 g. of a 10% palladium-on-charcoal catalyst. When reduction was complete, the solution was filtered from the catalyst, the filtrate evaporated to dryness, and the residue taken into chloroform and washed with aqueous potassium bicarbonate. The organic layer was then washed with water, dried over sodium sulfate, evaporated to dryness, and the red solid residue recrystallized once from acetonitrile and once from benzene to give 2.6 g. of 5,5 - dimethyl-10-hydroxy-8-(3-methyl-2-octyl)-1,2,3,4 - tetrahydro - 5H - [1]benzopyrano[3,4-c]pyridine, M.P. 168–170° C.

*Analysis.*—Calcd. for $C_{23}H_{35}NO_2$ (percent): C, 77.26; H, 9.87; N, 3.92. Found (percent): C, 77.32; H, 10.06; N, 4.14.

(D) 5,5 - dimethyl-10-hydroxy-8-(3-methyl-2-octyl)-3-(2 - propynyl) - 1,2,3,4 - tetrahydro-5H-[1]benzopyrano[3,4-c]pyridine hydrochloride.—A mixture of 1.6 g. (0.004 mole) of 5,5-dimethyl-10-hydroxy-8-(3-methyl-2-octyl) - 1,2,3,4 - tetrahydro - 5H - [1]benzopyrano[3,4-c]pyridine, 0.52 g. (0.004 mole) of 3-bromo-1-propyne, 0.6 g. (0.006 mole) of anhydrous sodium carbonate, 0.1 g. of sodium iodide, and 30 ml. of absolute ethanol was stirred and refluxed under nitrogen for sixteen hours, cooled, filtered, and the filtrate evaporated to dryness. The red gummy residue was extracted with petroleum ether (B.P. 30–60° C.), the extracts concentrated to a small volume, filtered to remove about 300 mg. of a pink solid, and the filtrate evaporated to dryness. The resulting residue was taken into ether, the solution saturated with anhydrous hydrogen chloride, diluted with petroleum ether, and cooled to give 372 mg. of 5,5-dimethyl-10-hydroxy-8-(3-methyl-2-octyl) - 3 - (2 - propynyl)-1,2,3,4-tetrahydro - 5H - [1]benzopyrano[3,4-c]pyridine hydrochloride, M.P. 120–125° C.

*Analysis.*—Calcd. for $C_{26}H_{37}NO_2 \cdot HCl$ (percent): C, 72.28; H, 8.86; N, 3.24. Found (percent): C, 71.91; H, 8.43; N, 3.19.

EXAMPLE 3

3-allyl-5,5-dimethyl - 10 - hydroxy-8-(3-methyl-2-octyl)-1,2,3,4 - tetrahydro - 5H - [1]benzopyrano[3,4-c]pyridine hydrochloride A mixture of 1.6 g. (0.004 mole) of 5,5-dimethyl-10-hydroxy - 8 - (3-methyl - 2 - octyl)-1,2,3,4-tetrahydro-5H - [1]benzopyrano[3,4 - c]pyridine, 0.51 g. (0.004 mole) of 3-bromo-1-propene, 0.6 g. (0.006 mole) of anhydrus sodium carbonate, and 30 ml. of absolute ethanol was stirred and refluxed under nitrogen for sixteen hours, cooled, filtered, and the filtrate evaporated to dryness. The residue was taken into petroleum ether (B.P. 30–60° C.), filtered, and the filtrate saturated with anhydrous hydrogen chloride to give a yellow gummy precipitate, which was recrystallized from a petroleum ether-ethyl acetate mixture giving 0.54 g. of 3-allyl-5,5-dimethyl - 10 - hydroxy - 8 - (3-methyl - 2 - octyl)-1,2,3,4-tetrahydro - 5H - [1]benzopyrano[3,4-c]pyridine hydrochloride, M.P. 208–210° C.

*Analysis.*—Calcd. for $C_{26}H_{39}NO_2 \cdot HCl$ (percent): C, 71.94; H, 9.29; N, 3.22. Found (percent): C, 72.08; H, 9.31; N, 3.04.

EXAMPLE 4

3 - (trans - 3 - chloroallyl) - 5,5-dimethyl-10-hydroxy-8 - (3 - methyl-2-octyl) - 1,2,3,4-tetrahydro - 5H - [1]benzopyrano[3,4-c]pyridine hydrochloride was prepared from 1.6 g. (0.004 mole) of 5,5-dimethyl-10-hydroxy-8-(3-methyl-2-octyl) - 1,2,3,4 - tetrahydro - 5H - [1]benzopyrano[3,4-c]pyridine, 0.48 g. (0.004 mole) of trans-1,3-dichloro-1-propene, 0.6 g. (0.006 mole) of anhydrous sodium carbonate, and 30 ml. of absolute ethanol using the manipulative procedure described above in Example 3. The crude product was isolated in the form of its hydrochloride salt, and the latter recrystallized once from a petroleum ether/ethyl acetate mixture, and once from an ethyl acetate/ethanol mixture giving 0.31 g. of 3-(trans - 3 - chloroallyl) - 5,5 - dimethyl-10-hydroxy-8-(3 - methyl - 2 - octyl)-1,2,3,4-tetrahydro-5H-[1]benzopyrano[3,4-c]pyridine hydrochloride, M.P. 250–253° C.

*Analysis.*—Calcd. for $C_{26}H_{38}ClNO_2 \cdot HCl$ (percent): C, 66.66; H, 8.39; N, 2.99. Found (percent): C, 66.41; H, 8.52; N, 2.88.

EXAMPLE 5

10-hydroxy-3-(2-propynyl)-5,5,8-trimethyl-1,2,3,4-tetrahydro-5H-[1]benzopyrano[3,4-c]pyridine (A) 3-benzyl - 10 - hydroxy-8-methyl-5-oxo-1,2,3,4-tetrahydro - 5H - [1]benzopyrano[3,4 - c]pyridine.—1-benzyl-3-carbethoxy-4-piperidone hydrochloride, (104 g., 0.33 mole) was mixed with 50 g. (0.4 mole) of 5-methylresorcinol, and the mixture treated dropwise over a period of one hour with 160 ml. of concentrated sulfuric acid. Phosphorus oxychloride (60 ml.) was then added all at once, and the mixture stirred at room temperature for sixteen hours. Isolation of the product according to the procedure described above in Example 1–A afforded 0.6 g. of 3-benzyl-10-hydroxy-8-methyl-5-oxo-1,2,3,4-tetrahydro-5H-[1]benzopyrano[3,4-c]pyridine, M.P. 222–224° C.

*Analysis.*—Calcd. for C₂₀H₁₉NO₃ (percent): C, 74.74; H, 5.96; N, 4.36. Found (percent): C, 74.58; H, 5.86; N, 4.29.

(B) 10 - hydroxy - 8 - methyl-5-oxo-1,2,3,4-tetrahydro-5H-[1]benzopyrano[3,4-c]pyridine was prepared by catalytic debenzylation of 2 g. (0.006 mole) of 3-benzyl-10-hydroxy - 8 - methyl - 5 - oxo-1,2,3,4-tetrahydro-5H-[1]benzopyrano[3,4-c] pyridine in 100 ml. of glacial acetic acid and 50 ml. of absolute ethanol under 54 pounds p.s.i. of hydrogen over 0.5 g. of 10% palladium-on-charcoal using the manipulative procedure described above in Example 2–C. Recrystallization of the crude product from ethanol afforded 0.1 g. of 10-hydroxy-8-methyl-5-oxo-1,2,3,4-tetrahydro - 5H - [1]benzopyrano [3,4-c]pyridine, M.P. 250–253° C.

*Analysis.*—Calcd. for C₁₃H₁₃NO₃ (percent): C, 67.52; H, 5.67; N, 6.06. Found (percent): C, 67.24; H, 5.71; N, 6.04.

(C) 10 - hydroxy - 8 - methyl-5-oxo-3-(2-propynyl)-1,2,3,4 - tetrahydro - 5H - [1]benzopyrano[3,4-c]pyridine was prepared from 2.9 g. (0.01 mole) of 10-hydroxy - 8 - methyl - 5 - oxo-1,2,3,4-tetrahydro-5H-[1] benzopyrano[3,4-c]pyridine, 2.1 g. (0.02 mole) of anhydrous sodium carbonate, and 1.19 g. (0.01 mole) of 3-bromo-1-propyne in 175 ml. of absolute ethanol using the manipulative procedure described above in Example 3. The crude product was recrystallized from acetonitrile to give 0.14 g. of 10-hydroxy-8-methyl-5-oxo-3-(2-propynyl)-1,2,3,4 - tetrahydro - 5H - [1]benzopyrano[3,4-c]pyridine, M.P. 197–200° C.

*Analysis.*—Calcd. for C₁₆H₁₅NO₃ (percent): C, 71.36; H, 5.61; N, 5.20. Found (percent): C, 71.14; H, 5.93; N, 5.14.

(D) 10 - hydroxy - 3 - (2 - propynyl)-5,5,8-trimethyl-1,2,3,4-tetrahydro - 5H - [1]benzopyrano[3,4-c]pyridine is prepared by reacting 10 - hydroxy - 8 - methyl -5-oxo - 3 - (2-propynyl)-1,2,3,4-tetrahydro - 5H - [1]benzopyrano[3,4-c]pyridine with methyl magnesium iodide in anisole according to the manipulative procedure described above in Example 1–B.

EXAMPLE 6

3-benzyl-10-hydroxy - 5,5,8 - trimethyl-1,2,3,4 - tetrahydro - 5H - [1]-benzopyrano[3,4-c]pyridine was prepared from 15.6 g. (0.048 mole) of 3-benzyl-10-hydroxy-8 - methyl - 5-oxo-1,2,3,4-tetrahydro-5H-[1]benzopyrano[3,4-c]pyridine and 0.5 mole of methyl magnesium bromide in 350 ml. of anisole, and 120 ml. of pyridine using the manipulative procedure described above in Example 1–B. The crude product was recrystallized from acetonitrile to give 4.0 g. of 3-benzyl-10-hydroxy-5,5,8-trimethyl-1,2,3,4-tetrahydro - 5H - [1]benzopyrano[3,4-c]pyridine, M.P. 206–208° C.

*Analysis.*—Calcd. for C₂₂H₁₆NO₂ (percent): C, 78.77; H, 7.51; N, 4.18. Found (percent): C, 79.15; H, 7.36; N, 4.28.

EXAMPLE 7

5,5 - dimethyl - 10 - hydroxy-8-(3-methyl-2-octyl)-3-(2-propynyl) - 1,2,3,4 - tetrahydro - 5H - [1]benzopyrano [3,4-c]pyridine hydrochloride (A) 10 - hydroxy - 8 - (3 - methyl-2-octyl)-5-oxo-1,2,3,4 - tetrahydro - 5H - [1]benzopyrano[3,4-c]pyridine was prepared by catalytic debenzylation of 3-benzyl-10-hydroxy - 8 - (3 - methyl-2-octyl)-5-oxo-1,2,3,4-tetrahydro-5H-[1]benzopyrano[3,4-c]pyridine in 200 ml. of absolute ethanol and 20 ml. of glacial acetic acid under 50 pounds p.s.i. of hydrogen over 1 g. of a 10% palladium-on-charcoal catalyst using the manipulative procedure described above in Example 2–C. The crude product was recrystallized twice from acetonitrile giving 1.9 g. of 10-hydroxy - 8 - (3 - methyl-2-octyl)-5-oxo-1,2,3,4-tetrahydro - 5H - [1]benzopyrano[3,4-c]pyridine, M.P. 177–179° C.

*Analysis.*—Calcd. for C₂₁H₂₉NO₃ (percent): C, 73.43; H, 8.51; N, 4.08. Found (percent): C, 73.06; H, 8.47; N, 4.23.

10-hydroxy - 8 - (3 - methyl-2-octyl)-5-oxo-1,2,3,4-tetrahydro-5H-[1]benzopyrano[3,4-c]pyridine was also prepared by reaction of 5.8 g. (0.025 mole) of 3-carbethoxy-4-piperidone hydrochloride with 5.9 g. (0.025 mole) of 5-(3-methyl-2-octyl)-resorcinol in 11.5 ml. of concentrated sulfuric acid and 4.5 ml. of phosphorus oxychloride using the manipulative procedure described above in Example 1–A. Recrystallization of the crude product from acetonitrile afforded 0.75 g. of 10-hydroxy-8-(3 - methyl - 2 - octyl) - 5 - oxo-1,2,3,4-tetrahydro-5H-[1]benzopyrano[3,4-c]pyridine, M.P. 179–181° C.

(B) 10-hydroxy-8-(3-methyl - 2 - octyl) - 5 - oxo-3-(2-propynyl) - 1,2,3,4-tetrahydro - 5H - [1]benzopyrano [3,4-c]pyridine hydrochloride was prepared by reacting of 3.4 g. (0.01 mole) of 10-hydroxy-8-(3-methyl-2-octyl)-5-oxo-1,2,3,4 - tetrahydro - 5H - [1]benzopyrano[3,4-c] pyridine with 1.18 g. (0.01 mole) of 3-bromo-1-propyne in 175 ml. of absolute ethanol in the presence of 2.1 g. (0.02 mole) of anhydrous sodium carbonate using the manipulative procedure described above in Example 3. The crude product was isolated in the form of its hydrochloride salt and the latter recrystallized from ethyl acetate giving 0.67 g. of 10 - hydroxy-8-(3-methyl-2-octyl) - 5 - oxo - 3 - (2-propynyl)-1,2,3,4-tetrahydro-5H-[1]benzopyrano[3,4-c]pyridine hydrochloride, M.P. 132–135° C.

*Analysis.*—Calcd for C₂₄H₃₁NO₃·HCl (percent): C, 68.97; H, 7.71; N, 3.35. Found (percent): C, 68.86; H, 7.79; N, 3.37.

(C) 5,5-dimethyl - 10 - hydroxy - 8 - (3-methyl - 2 - octyl) - 3 - (2 - propynyl) - 1,2,3,4-tetrahydro-5H-[1] benzopyrano[3,4-c]pyridine hydrochloride can be prepared by reaction of 10-hydroxy-8-(3-methyl-2-octyl)-5-oxo - 3 - (2 - propynyl) - 1,2,3,4-tetrahydro-5H-[1] benzopyrano[3,4-c]pyridine hydrochloride with methyl magnesium iodide in anisole, using the manipulative procedure described above in Example 1–B.

EXAMPLE 8

5,5-di - (1 - hexyl) - 10-hydroxy-3-methyl-8-(3-methyl-2-octyl) - 1,2,3,4 - tetrahydro  5H - [1]benzopyrano [3,4-c]pyridine Following a procedure similar to that described in Example 1–B hereinabove, 10-hydroxy - 3 - methyl-8-(3-methyl-2-octyl) - 1,2,3,4 - tetrahydro - 5H - [1]benzopyrano[3,4-c]pyridine is reacted with n-hexyl magnesium bromide in anisole to give 5,5-di-(1-hexyl)-10-hydroxy-3-methyl - 8 - (3 - methyl - 2 - octyl)-1,2,3,4-tetrahydro-5H-[1]benzopyrano[3,4-c]pyridine.

EXAMPLE 9

3-cinnamyl - 5,5 - dimethyl - 10 - hydroxy-8-(3-methyl-2 - octyl) - 1,2,3,4 - tetrahydro - 5H - [1]benzopyrano [3,4-c]pyridine Following a procedure similar to that described in Example 3, 5,5-dimethyl-10-hydroxy-8-(3 - methyl - 2 - octyl)-1,2,3,4 - tetrahydro - 5H - [1]benzopyrano[3,4-c] pyridine is reacted with cinnamyl chloride in the presence of anhydrous sodium carbonate to give 3-cinnamyl-5,5-dimethyl - 10 - hydroxy-8-(3-methyl-2-octyl)1,2,3,4-tetrahydro-5H-[1]benzopyrano[3,4-c]pyridine.

EXAMPLE 10

3 - acetyl - 5,5 - dimethyl - 10 - hydroxy-8-(3-methyl-2-octyl) - 1,2,3,4-tetrahydro-5H-[1]benzopyrano[3,4-c] pyridine By reaction of 5,5-dimethyl-10-hydroxy-8-(3 - methyl-2-octyl)-1,2,3-4-tetrahydro - 5H - [1]benzopyrano[3,4-c] pyridine with an equimolar amount of acetyl chloride in, for example a benzene solution, in the presence of triethylamine, there can be obtained 3-acetyl-5,5-dimethyl- 10-hydroxy - 8 - (3 - methyl-2-octyl)-1,2,3,4-tetrahydro-5H-[1]benzopyrano[3,4-c]pyridine.

EXAMPLE 11

5,5-dimethyl - 10 - hydroxy - 8 - (3-methyl-2-octyl)-3-phenylacetyl - 1,2,3,4 - tetrahydro - 5H[1]benzopyrano [3,4-c]pyridine By reaction of 5,5-dimethyl-10-hydroxy - 8 - (3-methyl-2-octyl)-1,2,3,4-tetrahydro-5H - [1]benzopyrano[3,4-c] pyridine with phenylacetyl chloride in the presence of pyridine in a benzene solution, there can be obtained 5,5-dimethyl-10-hydroxy - 8 - (3 - methyl - 2 - octyl)-3-phenylacetyl - 1,2,3,4 - tetrahydro - 5H - [1]benzopyrano [3,4-c]pyridine.

EXAMPLE 12

5,5 - dimethyl - 10 - hydroxy - 8 - (3-methyl-2-octyl)-3-(2 - phenylethyl) - 1,2,3,4 - tetrahydro - 5H-[1]benzopyrano[3,4-c-]-pyridine By reduction of 5,5-dimethyl-10-hydroxy-8-(3-methyl-2 - octyl - 3 - phenylacetyl-1,2,3,4-tetrahydro-5H-[1]benzopyrano-[3,4,-c]pyridine with lithium aluminum hydride in tetrahydrofuran solution, there can be obtained 5,5-dimethyl - 10 - hydroxy - 8 - (3 - methyl-2-octyl)-3-(2-phenylethyl) - 1,2,3,4 - tetrahydro - 5H-[1]benzopyrano-[3,4-c]pyridine.

EXAMPLE 13

5,5 - dimethyl - 10 - hydroxy - 8 - (3 - methyl-2-octyl)-3-[2 - (4 - methylphenyl)ethyl] - 1,2,3,4 - tetrahydro-5H-[1]benzopyrano-[3,4-c]pyridine Following a procedure similar to that described in Example 3 hereinabove, 5,5 - dimethyl - 10 - hydroxy - 8 - (3 - methyl - 2 - octyl) - 1,2,3,4 - tetrahydro - 5H - [1] benzopyrano [3,4 - c]pyridine is reacted with 2 - (4 - methylphenyl)ethyl bromide in absolute ethanol in the presence of anhydrous sodium carbonate to give 5,5 - dimethyl - 10 - hydroxy - 8- (3 - methyl - 2 - octyl) - 3 - [2 - (4 - methylphenyl)ethyl] - 1,2,3,4 - tetrahydro - 5H - [1]benzopyrano - [3,4 - c]pyridine.

EXAMPLE 14

5,5 - dimethyl - 10 - hydroxy - 8 - (3 - methyl - 2 - octyl)-3 - [3 - (3,4 - dimethoxyphenyl) - propyl] - 1,2,3,4 - tetrahydro - 5H - [1] - benzopyrano[3,4 - c]pyridine Following a procedure similar to that described in Example 3 hereinabove, 5,5 - dimethyl - 10 - hydroxy-8-(3-methyl - 2 - octyl) - 1,2,3,4 - tetrahydro - 5H - [1]benzopyrano[3,4-c]pyridine is reacted with 3 - (3,4 - dimethoxyphenyl)propyl bromide in absolute ethanol, in the presence of anhydrous sodium carbonate to give 5,5 - dimethyl - 10 - hydroxy - 8 - (3 - methyl - 2 - octyl) - 3 - [3 - (3,4 - dimethoxyphenyl)propyl] - 1,2,3,4 - tetrahydro-5H-[1]benzopyrano[3,4-c]pyridine.

EXAMPLE 15

5,5 - dimethyl - 10 - hydroxy - 8 - (3 - methyl - 2 - octyl)-3 - [1 - (2,4,6 - tribromophenyl) - ethyl] - 1,2,3,4 - tetrahydro - 5H - [1] - benzopyrano[3,4-c]pyridine Following a procedure similar to that described in Example 3 hereinabove, 5,5 - dimethyl - 10 - hydroxy - 8 - (3 - methyl - 2 - octyl) - 1,2,3,4 - tetrahydro - 5H - [1] benzopyrano[3,4-c]pyridine is reacted with 1 - (2,4,6 - tribromophenyl)ethyl bromide in the presence of anhydrous sodium carbonate to give 5,5 - dimethyl - 10 - hydroxy - 8 - (3 - methyl - 2 - octyl) - 3 - [1 - (2,4,6 - tribromophenyl) - ethyl] - 1,2,3,4 - tetrahydro - 5H - [1] benzopyrano[3,4-c]pyridine.

EXAMPLE 16

5,5 - dimethyl - 10 - hydroxy - 8 - (3 - methyl - 2 - octyl)-3 - [4 - (4 - nitrophenyl)butyl] - 1,2,3,4 - tetrahydro - 5H - [1]benzopyrano - [3,4-c]pyridine Following a procedure similar to that described in Example 3 hereinabove, 5,5 - dimethyl - 10 - hydroxy - 8 - (3 - methyl - 2 - octyl) - 1,2,3,4 - tetrahydro - 5H - [1] benzopyrano [3,4-c]pyridine is reacted with 4 - (4 - nitrophenyl)butyl bromide in the presence of anhydrous sodium carbonate to give 5,5 - dimethyl - 10 - hydroxy - 8 - (3 - methyl - 2 - octyl) - 3 - [4 - (4 - nitrophenyl)butyl]-1,2,3,4 - tetratydro - 5H - [1]benzopyrano[3,4-c]pyridine.

EXAMPLE 17

5,5 - dimethyl - 10 - hydroxy - 8 - (3 - methyl - 2 - octyl) 3 - [2 - (4 - methylmercapto - phenyl)ethyl] - 1,2,3,4-tetrahydro - 5H - [1]benzopyrano[3,4-c]pyridine Following a procedure similar to that described in Example 3 hereinabove, 5,5 - dimethyl - 10 - hydroxy - 8 - (3 - methyl - 2 - octyl) - 1,2,3,4 - tetrahydro - 5H - [1] benzopyrano [3,4-c]pyridine is reacted with 2 - (4 - methylmercaptophenyl)ethyl bromide in the presence of anhydrous sodium carbonate to give 5,5 - dimethyl - 10 - hydroxy - 8 - (3 - methyl - 2 - octyl) - 3 - [2 - (4 - methylmercaptophenyl)ethyl] - 1,2,3,4 - tetrahydro - 5H - [1] benzopyrano - [3,4-c]pyridine.

EXAMPLE 18

5,5 - dimethyl - 10 - hydroxy - 8 - (3 - methyl - 2 - octyl)-3 - {3 - [1 - (3,4 - methylenedioxy - phenyl) - 1 - butenyl]} - 1,2,3,4 - tetrahydro - 5H - [1]benzopyrano-[3,4-c]pyridine Following a procedure similar to that described in Example 3 hereinabove, 5,5 - dimethyl - 10 - hydroxy - 8 - (3 - methyl - 2 - octyl) - 1,2,3,4 - tetrahydro - 5H - [1] benzopyrano[3,4-c]pyridine is reacted with 3 - [1 - (3,4-methylenedioxyphenyl) - 1 - butenyl]bromide in the presence of anhydrous sodium carbonate to give 5,5 - dimethyl - 10 - hydroxy - 8 - (3 - methyl - 2 - octyl) - 3 - {3 - [1 - (3,4 - methylenedioxyphenyl) - 1 - butenyl]} - 1,2,3,4 - tetrahydro - 5H - [1]benzopyrano[3,4-c]pyridine.

EXAMPLE 19

5,5 - dimethyl - 10 - hydroxy - 8 - (3 - methyl - 2 - octyl)-3 - {3 - [1(4 - acetylaminophenyl) - 1 - butenyl]} - 1,2,3,4 - tetrahydro - 5H - [1] - benzopyrano[3,4-c] pyridine Following a procedure similar to that described in Example 3 hereinabove, 5,5 - dimethyl - 10 - hydroxy - 8 - (3 - methyl - 2 - octyl) - 1,2,3,4-tetrahydro - 5H - [1] benzopyrano[3,4-c]pyridine is reacted with 3 - [1 - (4 - acetylaminophenyl) - butenyl] bromide in the presence of anhydrous sodium carbonate to give 5,5 - dimethyl - 10 - hydroxy - 8 - (3 - methyl - 2 - octyl) - 3 - {3 - [1 - (4 - acetylaminophenyl) - 1 - butenyl]} - 1,2,3,4 - tetrahydro - 5H - [1]benzopyrano - [3,4-c]pyridine.

EXAMPLE 20

5,5 - dimethyl - 10 - hydroxy - 8 - (3 - methyl - 2 - octyl)-3-{4-[1-(3-trifluoromethyl - phenyl) - 1 - butenyl]}-1,2,3,4-tetrahydro-5H-[1]benzopyrano[3,4-c]pyridine Following a procedure similar to that described in Example 3 hereinabove, 5,5 - dimethyl - 10 - hydroxy - 8- (3 - methyl - 2 - octyl) - 1,2,3,4 - tetrahydro - 5H - [1] benzopyrano[3,4-c]pyridine is reacted with 4 - [1 - (3 - trifluoromethylphenyl) - 1 - butenyl]bromide in the presence of anhydrous sodium carbonate to give 5,5 - dimethyle - 10 - hydroxy - 8 - (3 - methyl - 2 - octyl) - 3 - {4 - [1 - (3 - trifluoromethylphenyl) - 1 - butenyl]} - 1,2,3,4 - tetrahydro - 5H - [1]benzopyrano[3,4-c]pyridine.

EXAMPLE 21

3 - cyclopropylcarbonyl - 5,5 - dimethyl - 10 - hydroxy - 8 - (3 - methyl - 2 - octyl) - 1,2,3,4 - tetrahydro - 5H - [1]benzopyrano[3,4-c] - pyridine Following a procedure similar to that described in Example 11 hereinabove, 5,5 - dimethyl - 10 - hydroxy - 8 - (3 - methyl - 2 - octyl) - 1,2,3,4 - tetrahydro - 5H - [1] benzopyrano[3,4-c]pyridine is reacted with cyclopropylcarbonyl chloride in benzene solution in the presence of pyridine to give 3 - cyclopropyl - carbonyl - 5,5 - dimethyl-10-hydroxy-8-(3-methyl - 2 - octyl)-1,2,3,4-tetrahydro-5H-[1]benzopyrano[3,4-c]pyridine.

EXAMPLE 22

3-cyclopropylmethyl-5,5-dimethyl-10-hydroxy-8-(3-methyl-2-octyl)-1,2,3,4-tetrahydro-5H-[1]benzopyrano[3,4-c]pyridine Following a procedure similar to that described in Example 12 hereinabove, 3-cyclopropylcarbonyl-5,5 - dimethyl-10-hydroxy-8-(3 - methyl - 2 - octyl)-1,2,3,4-tetrahydro - 5H - [1] - benzopyrano[3,4-c]pyridine is reduced with lithium aluminum hydride in tetrahydrofuran to give 3-cyclopropylmethyl-5,5-dimethyl-10-hydroxy - 8-(3-methyl-2-octyl)-1,2,3,4 - tetrahydro - 5H-[1]benzopyrano[3,4-c]pyridine.

EXAMPLE 23

5,5-dimethyl-10-hydroxy-8-(3-methyl-2-octyl)-3-(3-phenyl-2-propynyl)1,2,3,4,tetrahydro-5H-[1]benzopyrano[3,4-c]pyridine Following a procedure similar to that described in Example 3 hereinabove, 5,5 - dimethyl-10-hydroxy-8-(3-methyl-2-octyl)-1,2,3,4 - tetrahydro - 5H-[1]benzopyrano[3,4-c]pyridine is reacted with 3-phenyl-2-propynyl bromide in absolute ethanol in the presence of anhydrous sodium carbonate to give 5,5-dimethyl-10-hydroxy-8-(3-methyl-2-octyl)-3-(3-phenyl-2-propynyl) - 1,2,3,4 - tetrahydro-5H-[1]benzopyrano-[3,4-c]pyridine.

EXAMPLE 24

10 - acetoxy-8-(3-methyl-2-octyl)-3,5,5-trimethyl-1,2,3,4-tetrahydro-5H-[1]-benzopyrano[3,4-c]pyridine By reacting 10-hydroxy-8-(3-methyl-2-octyl)-3,5,5-trimethyl-1,2,3,4 - tetrahydro - 5H - [1]benzopyrano[3,4-c]pyridine with acetic anhydride, there is obtained 10-acetoxy - 8 - (3 - methyl - 2 - octyl) - 3,5,5 - trimethyl-1,2,3,4-tetrahydro-5H-[1]benzopyrano[3,4-c]pyridine.

EXAMPLE 25

10-methoxy-8-(3-methyl-2-octyl)3,5,5-trimethyl - 1,2,3,4-tetrahydro-5H-[1]benzopyrano[3,4-c]pyridine By reacting 10-hydroxy-8-(3-methyl-2-octyl)-3,5,5-trimethyl-1,2,3,4 - tetrahydro - 5H - [1]benzopyrano[3,4-c]pyridine with methyl iodide in the presence of sodium ethoxide, there is obtained 10-methoxy-8 - (3-methyl-2-octyl) - 3,5,5 - trimethyl - 1,2,3,4 - tetrahydro - 5H - [1]benzopyrano[3,4-c]pyridine.

EXAMPLE 26

10-carbamyloxy-8-(3-methyl-2-octyl)-3,5,5-trimethyl-1,2,3,4-tetrahydro-5H-[1]benzopyrano[3,4-c]pyridine By reacting 10-hydroxy-8-(3-methyl-2-octyl)-3,5,5-trimethyl-1,2,3,4 - tetrahydro - 5H - [1]benzopyrano[3,4-c]pyridine with an equimolar amount of phosgene in the presence of dimethylaniline, and reacting the resulting chloroformate with liquid ammonia, there is obtained 10-carbamyloxy-8-(3 - methyl - 2 - octyl) - 3,5,5 - trimethyl-1,2,3,4-tetrahydro-5H-[1]benzopyrano[3,4-c]pyridine.

EXAMPLE 27

10-(N-methylcarbamyloxy)-8-(3-methyl-2-octyl)-3,5,5-trimethyl-1,2,3,4-tetrahydro-5H-[1]benzopyrano[3,4-c]pyridine By reacting 10-hydroxy-8-(3-methyl-2-octyl)-3,5,5-trimethyl-1,2,3,4 - tetrahydro - 5H - [1]benzopyrano[3,4-c]pyridine with an equimolar amount of phosgene in the presence of dimethylaniline, and reacting the resulting chloroformate with methylamine, there is obtained 10-(N - methylcarbamyloxy) - 8 - (3 - methyl - 2 - octyl)-3,5,5 - trimethyl - 1,2,3,4 - tetrahydro - 5H - [1]benzopyrano[3,4-c]pyridine.

EXAMPLE 28

10-(N,N-dimethylcarbamyloxy)-8-(3-methyl-2-octyl)-3,5,5-trimethyl-1,2,3,4-tetrahydro-5H-[1]benzopyrano[3,4-c]pyridine By reacting 10-hydroxy-8-(3-methyl-2-octyl)-3,5,5-trimethyl-1,2,3,4 - tetrahydro - 5H - [1]benzopyrano[3,4-c]pyridine with an equimolar amount of phosgene in the presence of dimethylaniline, and reacting the resulting chloroformate with dimethylamine, there is obtained 10-(N,N - dimethylcarbamyloxy) - 8 - (3-methyl - 2 - octyl) - 3,5,5 - trimethyl - 1,2,3,4 - tetrahydro-5H[1]benzopyrano[3,4-c]pyridine.

EXAMPLE 29

8-(3-methyl-2-octyl)-10-phosphonyloxy-3,5,5-trimethyl-1,2,3,4-tetrahydro-5H-[1]benzopyrano[3,4-c]pyridine By reacting 10-hydroxy-8-(3-methyl-2-octyl)-3,5,5-trimethyl-1,2,3,4 - tetrahydro - 5H - [1]benzopyrano[3,4-c]pyridine with one molar equivalent amount of phosphorus oxychloride in toluene in the presence of pyridine, and reacting the resulting dichlorophosphinate with aqueous potassium carbonate, there is obtained 8-(3-methyl-2-octyl) - 10 - phosphonyloxy - 3,5,5 - trimethyl - 1,2,3,4-tetrahydro-5H-[1]benzopyrano[3,4-c]pyridine.

EXAMPLE 30

10-hydroxy-8-(3-methyl-2-octyl)-3,5,5-trimethyl-5H-[1]benzopyrano[3,4-c]piperidine By reducing 10-hydroxy-8-(3-methyl-2-octyl)-3,5,5-trimethyl-1,2,3,4 - tetrahydro - 5H - [1]benzopyrano[3,4-c]pyridine with hydrogen in an ethanol solvent over a Raney nickel catalyst, there is obtained 10-hydroxy-8-(3-methyl-2-octyl)-3,5,5 - trimethyl - 5H - [1]benzopyrano[3,4-c]piperidine.

EXAMPLE 31

By reducing the compounds of Examples 2–B, 2–C, 8, 10, 11, 12, 13, 14, 15, 17, 21, 22, 24, 25, 26, 27, 28, and 29 with hydrogen over a Raney nickel catalyst following the procedure described in Example 30, there can be obtained the following respective compounds of Formula IIa:

(A) 3 - benzyl - 5,5 - dimethyl - 10 - hydroxy - 8 - (3-methyl-2-octyl)-5H-[1]benzopyrano[3,4-c]piperidine.

(B) 5,5 - dimethyl - 10 - hydroxy - 8 - (3 - methyl - 2-octyl)-5H-[1]benzopyrano[3,4-c]piperidine.

(C) 5,5 - di - (1 - hexyl) - 10 - hydroxy - 3 - methyl-8-(3-methyl - 2 - octyl)-5H-[1]benzopyrano[3,4-c]piperidine.

(D) 3 - acetyl - 5,5-dimethyl-10-hydroxy-8-(3-methyl-2-octyl)-5H[1]benzopyrano[3,4-c]piperidine.

(E) 5,5 - dimethyl - 10-hydroxy-8-(3-methyl-2-octyl)-3-phenylacetyl-5H-[1]benzopyrano[3,4-c]piperidine.

(F) 5,5 - dimethyl - 10-hydroxy-8-(3-methyl-2-octyl)-3-(2-phenylethyl)-5H-[1]benzopyrano[3,4-c]piperidine.

(G) 5,5 - dimethyl-10-hydroxy-8-(3-methyl-2-octyl)-3-[2 - (4 - methylphenyl)ethyl]-5H-[1]benzopyrano[3,4-c]piperidine.

(H) 5,5 - dimethyl - 10-hydroxy-8-(3-methyl-2-octyl)-3 - [3 - (3,4 - dimethoxyphenyl)propyl]-5H-[1]benzopyrano[3,4-c]piperidine.

(J) 5,5 - dimethyl - 10-hydroxy-8-(3-methyl-2-octyl)-3-[1 - (2,4,6 - tribromophenyl)ethyl]-5H-[1]benzopyrano[3,4-c]piperidine.

(K) 5,5 - dimethyl - 10-hydroxy-8-(3-methyl-2-octyl)-3 - [2 - (4 - methylmercaptophenyl)ethyl]-5H-[1]benzopyrano[3,4-c]piperidine.

(L) 3 - cyclopropylcarbonyl - 5,5-dimethyl-10-hydroxy-8 - (3 - methyl-2-octyl)-5H-[1]benzopyrano[3,4-c]piperidine.

(M) 3 - cyclopropylmethyl - 5,5-dimethyl-10-hydroxy-8 - (3 - methyl-2-octyl)-5H-[1]benzopyrano[3,4-c]piperidine.

(N) 10 - acetoxy-8-(3-methyl-2-octyl)-3,5,5-trimethyl-5H-[1]benzopyrano[3,4-c]piperidine.

(O) 10 - methoxy - 8 - (3 - methyl - 2-octyl)-3,5,5,-trimethy-5H-[1]benzopyrano[3,4-c]piperidine.

(P) 10 - carbamyloxy - 8-(3-methyl-2-octyl)-3,5,5-trimethyl-5H-[1]benzopyrano[3,4-c]piperidine.

(Q) 10 - (N - methylcarbamyloxy) - 8 - (3-methyl-2-octyl) - 3,5,5 - trimethyl-5H-[1]benzopyrano[3,4-c]piperidine.

(R) 10 - (N,N - dimethylcarbamyloxy)-8-(3-methyl-2-octyl) - 3,5,5 - trimethyl-5H-[1]benzopyrano[3,4-c]piperidine.

(S) 8 - (3- - methyl-2-octyl)-10-phosphonyloxy-3,5,5-trimethyl-5H-[1]benzopyrano[3,4-c]piperidine.

EXAMPLE 32

3 - allyl - 5,5 - dimethyl-10-hydroxy-8-(3-methyl-2-octyl)-5H-[1]benzopyrano[3,4-c]piperidine Following a procedure similar to that described in Example 3 hereinabove, 5,5 - dimethyl - 10 - hydroxy-8-(3-methyl - 2-octyl)-5H-[1]benzopyrano[3,4-c]piperidine is reacted with 3-bromo-1-propene in absolute ethanol in the presence of anhydrous sodium carbonate to give 3-allyl-5,5 - dimethyl - 10 - hydroxy - 8 - (3-methyl-2-octyl)-5H-[1]benzopyrano[3,4-c]piperidine.

EXAMPLE 33

3 - (trans - 3-chloroallyl)-5,5-dimethyl-10-hydroxy-8-(3-methyl-2-octyl)-5H-[1]benzopyrano[3,4-c]piperidine Following a procedure similar to that described in Example 3 hereinabove, 5,5 - dimethyl - 10 - hydroxy-8-(3-methyl - 2 - octyl)-5H-[1]benzopyrano[3,4-c]piperidine is reacted with trans-1,3-dichloro-1-propene in absolute ethanol in the presence of anhydrous sodium carbonate to give 3 - (trans - 3 - chloroallyl)-5,5-dimethyl-10-hydroxy-8-(3-methyl-2-octyl)-5H-[1]benzopyrano[3,4-c]piperidine.

EXAMPLE 34

10 - hydroxy - 3-(2-propynyl)-5,5,8-trimethyl-5H-[1]benzopyrano[3,4-c]piperidine Following a procedure similar to that described in Example 3 hereinabove, 10 - hydroxy - 5,5,8-trimethyl-5H-[1]benzopyrano[3,4-c]pyridine is reacted with 3-bromo-l-propyne in absolute ethanol in the presence of anhydrous sodium carbonate to give 10 - hydroxy - 3 - (2-propynyl)-5,5,8-trimethyl-5H-[1]benzopyrano[3,4-c]piperidine.

EXAMPLE 35

5,5 - dimethyl - 10 - hydroxy-8-(3-methyl-2-octyl)-3-(2-propynyl)-5H-[1]benzopyrano[3,4-c]piperidine Following a procedure similar to that described in Example 3 hereinabove, 5,5 - dimethyl - 10 - hydroxy-8-(3-methyl - 2-octyl)-5H-[1]benzopyrano[3,4-c]piperidine is reacted with 3-bromo-1-propyne in absolute ethanol in the presence of anhydrous sodium carbonate to give 5,5-dimethyl - 10 - hydroxy - 8 - (3-methyl-2-octyl)-3-(2-propynyl)-5H-[1]benzopyrano[3,4-c]piperidine.

EXAMPLE 36

3 - cinnamyl - 5,5 - dimethyl-10-hydroxy-8-(3-methyl-2-octyl)-5H-[1]benzopyrano[3,4-c]piperidine Following a procedure similar to that described in Example 3 hereinabove, 5,5 - dimethyl - 10 - hydroxy-8-(3-methyl - 2-octyl)-5H-[1]benzopyrano[3,4-c]piperidine is reacted with cinnamyl chloride in absolute ethanol in the presence of anhydrous sodium carbonate to give 3-cinnamyl - 5,5 - dimethyl - 10-hydroxy-8-(3-methyl-2-octyl)-5H-[1]benzopyrano[3,4-c]piperidine.

EXAMPLE 37

5,5 - dimethyl - 10-hydroxy-8-(3-methyl-2-octyl)-3-[4-(4-nitrophenyl)butyl]-5H-[1]benzopyrano[3,4-c]piperidine Following a procedure similar to that described in Example 3 hereinabove, 5,5 - dimethyl - 10 - hydroxy-8-(3-methyl - 2-octyl)-5H-[1]benzopyrano[3,4-c]piperidine is reacted with 4-(4-nitrophenyl)butyl bromide in absolute ethanol in the presence of anhydrous sodium carbonate to give 5,5 - dimethyl - 10 - hydroxy-8-(3-methyl-2-octyl)-3-[4 - (4 - nitrophenyl)butyl]-5H-[1]benzopyrano[3,4-c]piperidine.

EXAMPLE 38

5,5-dimethyl-10-hydroxy-8-(3-methyl - 2 - octyl)-3-{3-[1-(3,4 - methylenedioxyphenyl) - 1 - butenyl]}-5H-[1]benzopyrano[3,4-c]piperidine Following a procedure similar to that described in Example 3 hereinabove, 5,5 - dimethyl-10-hydroxy-8-(3-methyl-2-octyl)-5H - [1]benzopyrano[3,4-c]piperidine is reacted with 3-[1-(3,4-methylenedioxyphenyl)-1-butenyl] bromide in absolute ethanol in the presence of anhydrous sodium carbonate to give 5,5-dimethyl-10-hydroxy-8-(3-methyl-2-octyl)-3-{3-[1-(3,4-methylenedioxyphenyl) - 1 - butenyl]}-5H-[1]benzopyrano[3,4-c]-piperidine.

EXAMPLE 39

5,5-dimethyl-10-hydroxy-8-(3 - methyl - 2-octyl)-3-{3-[1-(4 - acetylaminophenyl) - 1 - butenyl]}-5H-[1]benzopyrano[3,4-c]-piperdine Following a procedure similar to that described in Example 3 hereinabove, 5,5-dimethyl-10-hydroxy-8-(3-methyl-2-octyl) - 5H-[1]benzopyrano[3,4-c]piperidine is reacted with 3-[1-(4-acetylaminophenyl) - 1-butenyl] bromide in absolute ethanol in the presence of anhydrous sodium carbonate to give 5,5-dimethyl-10-hydroxy-8-(3-methyl-2-octyl)-3-{3-[1 - (4 - acetylaminophenyl) - 1 - butenyl]}-5H-[1]benzopyrano[3,4-c]-piperidine.

EXAMPLE 40

5,5-dimethyl-10-hydroxy-8-(3-methyl - 2 - octyl)-3-{4-[1-(3-trifluoromethylphenyl) - 1 - butenyl]}-5H-[1]benzopyrano[3,4-c]piperidine Following a procedure similar to that described in Example 3 hereinabove, 5,5-dimethyl-10-hydroxy-8-(3-methyl-2-octyl) - 5H-[1]benzopyrano[3,4-c]piperidine is reacted with 4-[1-(3-trifluoromethylphenyl)-1 - butenyl] bromide in absolute ethanol in the presence of anhydrous sodium carbonate to give 5,5-dimethyl-10-hydroxy-8-(3-methyl - 2 - octyl)-3-{4-[1-(3-trifluoromethylphenyl)-1-butenyl]}-5H-[1]benzopyrano[3,4-c]piperidine.

EXAMPLE 41

5,5-dimethyl-10-hydroxy-8 - (3-methyl - 2 - octyl)-3-(3-phenyl-2-propynyl)-5H - [1]benzopyrano[3,4-c]piperidine Following a procedure similar to that described in Example 3 hereinabove, 5,5-dimethyl-10-hydroxy-8-(3-methyl-2-octyl) - 5H-[1]benzopyrano[3,4-c]piperidine is reacted with 3-phenyl-2-propynyl bromide in absolute ethanol in the presence of anhydrous sodium carbonate to give 5,5 - dimethyl-10-hydroxy-8-(3-methyl-2-octyl)-3-(3- phenyl-2-propynyl) - 5H - [1]benzopyrano[3,4-c] piperidine.

EXAMPLE 42

3-benzyl-8-hydroxy-10-methyl-5-oxo-1,2,3,4-tetrahydro-5H-[1]benzopyrano[3,4-c]pyridine is obtained by reaction of 1-benzyl-3-carbethoxy-4 - piperidone with 5 - methylresorcinol according to the procedure described above in Example 5–A.

EXAMPLE 43

8-hydroxy-10-methyl-5-oxo-1,2,3,4-tetrahydro-5H - [1] benzopyrano[3,4 - c]pyridine is prepared by catalytic debenzylation of 3 - benzyl-8-hydroxy-10-methyl-5-oxo-1,2,3,4 - tetrahydro - 5H-[1]benzopyrano[3,4-c]pyridine according to the procedure described above in Example 5–B.

EXAMPLE 44

8-hydroxy-5,5,10-trimethyl-1,2,3,4-tetrahydro - 5H-[1] benzopyrano[3,4 - c]pyridine is prepared by reacting 8-hydroxy - 10 - methyl - 5-oxo-1,2,3,4-tetrahydro-5H-[1] benzopyrano[3,4 - c]pyridine with methyl magnesium iodide according to the procedure described above in Example 6.

EXAMPLE 45

8 - hydroxy-3,5,5,10-tetramethyl-1,2,3,4-tetrahydro-5H-[1]benzopyrano[3,4-c]pyridine is prepared by reaction of 8-hydroxy - 10 - methyl-5,5-dimethyl-1,2,3,4-tetrahydro-5H-[1]benzopyrano[3,4-c]pyridine with methyl bromide in the presence of anhydrous sodium carbonate according to the procedure described above in Example 3.

EXAMPLE 46

3-benzyl-8-hydroxy-5,5,10 - trimethyl - 1,2,3,4 - tetrahydro-5H-[1]benzopyrano[3,4-c]pyridine is prepared by reacting 3-benzyl-8-hydroxy-10-methyl-5-oxo-1,2,3,4-tetrahydro-5H-[1]benzopyrano[3,4 - c]pyridine with methyl magnesium bromide in anisole according to the procedure described above in Example 6.

EXAMPLE 47

8-hydroxy-10-methyl-5,5-dihexyl - 1,2,3,4 - tetrahydro-5H-[1]benzopyrano[3,4-c]pyridine is prepared by reacting 8-hydroxy-10-methyl-5-oxo-1,2,3,4-tetrahydro-5H-[1] benzopyrano[3,4-c]pyridine with n-hexyl magnesium bromide according to the procedure described above in Example 6.

EXAMPLE 48

3-cinnamyl-8-hydroxy-5,5,10-trimethyl - 1,2,3,4 - tetrahydro-5H - [1]benzopyrano[3,4-c]pyridine is prepared by reacting 8 - hydroxy - 5,5,10-trimethyl-1,2,3,4-tetrahydro-5H - [1]benzopyrano[3,4-c]pyridine with cinnamyl chloride in the presence of anhydrous sodium carbonate according to the procedure described above in Example 3.

EXAMPLE 49

3 - acetyl - 8 - hydroxy-5,5,10-trimethyl-1,2,3,4-tetrahydro-5H-[1]benzopyrano[3,4-c]pyridine is prepared by reacting 8 - hydroxy-5,5,10-trimethyl-1,2,3,4-tetrahydro-5H - [1]benzopyrano[3,4-c]pyridine with an equimolar amount of acetyl chloride in a benzene solution and in the presence of triethylamine according to the procedure described above in Example 10.

EXAMPLE 50

3-phenylacetyl-8-hydroxy - 5,5,10 - trimethyl-1,2,3,4-tetrahydro - 5H - [1]benzopyrano[3,4-c]pyridine is prepared by reacting 8 - hydroxy-5,5,10-trimethyl-1,2,3,4-tetrahydro-5H-[1]benzopyrano[3,4-c]pyridine with phenylacetyl chloride in a benzene solution and in the presence of pyridine according to the procedure described above in Example 11.

EXAMPLE 51

3-(2-phenylethyl)-8-hydroxy-5,5,10-trimethyl - 1,2,3,4-tetrahydro-5H-[1]benzopyrano[3,4-c]pyridine is prepared by reacting 3 - phenylacetyl-8-hydroxy-5,5,10-trimethyl-1,2,3,4 - tetrahydro-5H-[1]benzopyrano[3,4 - c]pyridine with lithium aluminum hydride in a tetrahydrofuran solution according to the procedure described above in Example 12.

EXAMPLE 52

3-[2-(4-methylphenyl)ethyl] - 8 - hydroxy-5,5,10-trimethyl - 1,2,3,4-tetrahydro - 5H - [1]benzopyrano[3,4-c] pyridine is prepared by reacting 8-hydroxy-5,5,10-trimethyl - 1,2,3,4 - tetrahydro - 5H - [1]benzopyrano[3,4-c] pyridine with 2-(4-methylphenyl)ethyl bromide in absolute ethanol in the presence of anhydrous sodium carbonate according to the procedure described above in Example 3.

EXAMPLE 53

3 - [3 - (3,4 - dimethoxyphenyl)propyl] - 8 - hydroxy-5,5,10-trimethyl - 1,2,3,4 - tetrahydro-5H-[1]benzopyrano [3,4-c]pyridine is prepared by reacting 8-hydroxy-5,5,10-trimethyl - 1,2,3,4 - tetrahydro-5H-[1]benzopyrano[3,4-c] pyridine with 3-(3,4-dimethoxyphenyl)propyl bromide in absolute ethanol in the presence of anhydrous sodium carbonate according to the procedure described above in Example 3.

EXAMPLE 54

3 - [1 - (2,4,6 - tribromophenyl)ethyl]-8-hydroxy-5,5,10-trimethyl-1,2,3,4 - tetrahydro - 5H - [1]benzopyrano [3,4-c]pyridine is prepared by reacting 8-hydroxy-5,5,10-trimethyl - 1,2,3,4 - tetrahydro - 5H - [1]benzopyrano [3,4-c]pyridine with 1-(2,4,6 - tribromophenyl)-ethyl bromide in absolute ethanol in the presence of anhydrous sodium carbonate according to the procedure described above in Example 3.

EXAMPLE 55

3[4-(4-nitrophenyl)butyl] - 8 - hydroxy-5,5,10-trimethyl-1,2,3,4-tetrahydro - 5H - [1]benzopyrano[3,4-c]pyridine is prepared by reacting 8-hydroxy - 5,5,10 - trimethyl-1,2,3,4 - tetrahydro - 5H-[1]benzopyrano[3,4-c]pyridine with 4-(4-nitrophenyl)butyl bromide in absolute ethanol in the presence of anhydrous sodium carbonate according to the procedure described above in Example 3.

EXAMPLE 56

3 - [2 - (4 - methylmercaptophenyl)ethyl]-8-hydroxy-5,5,10-trimethyl - 1,2,3,4 - tetrahydro-5H-[1]benzopyrano [3,4-c]pyridine is prepared by reacting 8-hydroxy-5,5,10-trimethyl - 1,2,3,4 - tetrahydro-5H-[1]benzopyrano[3,4-c] pyridine with 2-(4-methylmercaptophenyl) - ethyl bromide in absolute ethanol in the presence of anhydrous sodium carbonate according to the procedure described above in Example 3.

EXAMPLE 57

3 - {3 - [1 - (3,4 - methylenedioxyphenyl)-1-butenyl]}-8-hydroxy - 5,5,10 - trimethyl - 1,2,3,4 - tetrahydro-5H-[1]benzopyrano[3,4-c]pyridine is prepared by reacting 8-hydroxy - 5,5,10 - trimethyl - 1,2,3,4 - tetrahydro-5H-[1] benzopyrano[3,4-c]pyridine with 3-[1-(3,4 - methylenedioxyphenyl) - 1 - butenyl] bromide in absolute ethanol in the presence of anhydrous sodium carbonate according to the procedure described above in Example 3.

EXAMPLE 58

3 - {3 - [1 - (4 - acetylaminophenyl)-1-butenyl]}-8-hydroxy - 5,5,10 - trimethyl - 1,2,3,4 - tetrahydro-5H-[1] benzopyrano[3,4-c]pyridine is prepared by reacting 8-hydroxy - 5,5,10 - trimethyl-1,2,3,4-tetrahydro - 5H - [1] benzopyrano[3,4-c]pyridine with 3-[1-(4 - acetylaminophenyl)-1-butenyl] bromide in absolute ethanol in the presence of anhydrous sodium carbonate according to the procedure described above in Example 3.

EXAMPLE 59

3 - {4 - [1 - (3 - trifluoromethylphenyl)-1-butenyl]}-8-hydroxy - 5,5,10 - trimethyl - 1,2,3,4 - tetrahydro-5H-[1]benzopyrano[3,4-c]pyridine is prepared by reacting 8-hydroxy - 5,5,10 - trimethyl - 1,2,3,4 - tetrahydro-5H-[1]benzopyrano[3,4-c]pyridine with 4-[1-(3-trifluoromethylphenyl)-1-butenyl]bromide in absolute ethanol in the presence of anhydrous sodium carbonate according to the procedure described above in Example 3.

EXAMPLE 60

3-cyclopropylcarbonyl - 8 - hydroxy - 5,5,10 - trimethyl-1,2,3,4 - tetrahydro - 5H - [1]benzopyrano[3,4-c]pyridine is prepared by reacting 8-hydroxy-5,5,10-trimethyl-1,2,3,4-tetrahydro - 5H - [1]benzopyrano[3,4-c]pyridine with cyclopropylcarbonyl chloride in a benzene solution and in the presence of pyridine according to the procedure described above in Example 21.

EXAMPLE 61

3-cyclopropylmethyl - 8 - hydroxy - 5,5,10 - trimethyl-1,2,3,4 - tetrahydro - 5H - [1]benzopyrano[3,4-c]pyridine is prepared by reducing 3-cyclopropylcarbonyl-8-hydroxy-5,5,10-trimethyl - 1,2,3,4 - tetrahydro-5H-[1]benzopyrano[3,4-c]pyridine with lithium aluminum hydride according to the procedure described above in Example 22.

EXAMPLE 62

3 - (3 - phenyl - 2 - propynyl)-8-hydroxy-5,5,10-trimethyl - 1,2,3,4 - tetrahydro - 5H - [1]benzopyrano[3,4-c]pyridine is prepared by reacting 8-hydroxy-5,5,10-trimethyl-1,2,3,4-tetrahydro - 5H - [1]benzopyrano[3,4-c]pyridine with 3-phenyl-2-propynyl bromide in absolute ethanol in the presence of anhydrous sodium carbonate according to the procedure described above in Example 3.

EXAMPLE 63

3-allyl - 8 - hydroxy - 5,5,10 - trimethyl-1,2,3,4-tetrahydro - 5H - [1]benzopyrano[3,4-c]pyridine is prepared by reacting 8-hydroxy-5,5,10-trimethyl - 1,2,3,4 - tetrahydro-5H - [1]benzopyrano[3,4-c]pyridine with 3-bromo-1-propene in absolute ethanol in the presence of anhydrous sodium carbonate according to the procedure described above in Example 3.

EXAMPLE 64

3-(2-propynyl) - 8 - hydroxy - 5,5,10 - trimethyl-1,2,3,4 tetrahydro - 5H - [1]benzopyrano[3,4-c]pyridine is prepared by reacting 8-hydroxy - 5,5,10 - trimethyl - 1,2,3,4-tetrahydro-5H-[1]benzopyrano[3,4-c]pyridine with 3-bromo-1-propyne in absolute ethanol in the presence of anhydrous sodium carbonate according to the procedure described above in Example 2–D.

EXAMPLE 65

3-(trans - 3 - chloroallyl) - 8 - hydroxy - 5,5,10 - trimethyl - 1,2,3,4 - tetrahydro - 5H - [1]benzopyrano[3,4-c]pyridine is prepared by reacting 8-hydroxy-5,5,10-trimethyl - 1,2,3,4 - tetrahydro - 5H - [1]benzopyrano[3,4-c]pyridine with trans-1,3-dichloro - 1 - propyne in absolute ethanol in the presence of anhydrous sodium carbonate according to the procedure described above in Example 4.

EXAMPLE 66

8 - acetoxy - 3,5,5,10 - tetramethyl - 1,2,3,4 - tetrahydro-5H - [1]benzopyrano[3,4 - c]pyridine is prepared by reacting 8 - hydroxy - 3,5,5,10 - tetramethyl - 1,2,3,4-tetrahydro - 5H - [1]benzopyrano[3,4 - c]pyridine with acetic anhydride according to the procedure described above in Example 24.

EXAMPLE 67

8 - methoxy - 3,5,5,10 - tetramethyl - 1,2,3,4 - tetrahydro - 5H - [1]benzopyrano[3,4-c]pyridine is prepared by reacting 8 - hydroxy - 3,5,5,10 - tetramethyl - 1,2,3,4- tetrahydro - 5H - [1]benzopyrano[3,4 - c]pyridine with methyl iodide in the presence of sodium ethoxide according to the procedure described above in Example 25.

EXAMPLE 68

8 - carbamyloxy - 3,5,5,10 - tetramethyl - 1,2,3,4 - tetrahydro - 5H - [1] - benzopyrano[3,4 - c]pyridine is prepared by reacting 8 - hydroxy 3,5,5,10 - tetramethyl - 1,2,3,4 - tetrahydro - 5H - [1]benzopyrano[3,4 - c] - pyridine with an equimolar amount of phosgene in the presence of dimethylaniline, and reacting the resulting chloroformate with liquid ammonia according to the procedure described above in Example 26.

EXAMPLE 69

8 - (N - methylcarbamyloxy) - 3,5,5,10 - tetramethyl-1,2,3,4 - tetrahydro - 5H - [1]benzopyrano[3,4 - c]pyridine is prepared by reacting 8 - hydroxy - 3,5,5,10 - tetramethyl - 1,2,3,4 - tetrahydro - 5H - [1]benzopyrano[3,4-c]pyridine with an equimolar amount of phosgene in the presence of dimethylaniline, and reacting the resulting chloroformate with methylamine according to the procedure described above in Example 27.

EXAMPLE 70

8 - (N,N - dimethylcarbamyloxy) - 3,5,5,10 - tetramethyl - 1,2,3,4 - tetrahydro - 5H - [1]benzopyrano[3,4-c]pyridine is prepared by reacting 8 - hydroxy - 3,5,5,10-tetramethyl - 1,2,3,4 - tetrahydro - 5H - [1]benzopyrano[3,4 - c]pyridine with an equimolar amount of phosgene in the presence of dimethylaniline, and reacting the resulting chloroformate with dimethylamine according to the procedure described above in Example 28.

EXAMPLE 71

8 - phosphonyloxy - 3,5,5,10 - tetramethyl - 1,2,3,4-tetrahydro - 5H - [1]benzopyrano[3,4 - c]pyridine is prepared by reacting 8 - hydroxy - 3,5,5,10 - tetramethyl-1,2,3,4 - tetrahydro - 5H - [1]benzopyrano[3,4 - c]pyridine with one molar amount of phosphorus oxychloride in toluene in the presence of pyridine, and reacting the resulting dichlorophosphinate with aqueous potassium carbonate according to the procedure described above in Example 29.

EXAMPLE 72

By reducing the compounds of Examples 44–71 with hydrogen over a Raney nickel catalyst, following the procedure described above in Example 30, there can be obtained the following respective compounds of Formula IIb:

(A) 8 - hydroxy - 5,5,10 - trimethyl - 5H - [1]benzopyrano[3,4 - c]piperidine.

(B) 8 - hydroxy - 3,5,5,10 - tetramethyl - 5H - [1]benzopyrano[3,4-c]piperidine.

(C) 3 - benzyl - 8 - hydroxy - 5,5,10 - trimethyl - 5H-[1]benzopyrano[3,4-c]piperidine.

(D) 8 - hydroxy - 10 - methyl - 5,5 - dihexyl - 5H - [1]benzopyrano[3,4-c]piperidine.

(E) 3- - cinnamyl - 8 - hydroxy - 5,5,10 - trimethyl-5H-[1]benzopyrano[3,4-c]piperidine.

(F) 3 - acetyl - 8 - hydroxy - 5,5,10 - trimethyl - 5H-[1]benzopyrano[3,4-c]piperidine.

(G) 3 - phenylacetyl - 8 - hydroxy - 5,5,10 - trimethyl-5H-[1]benzopyrano[3,4-c]piperdine.

(H) 3 - (2 - phenylethyl) - 8 - hydroxy - 5,5,10 - trimethyl-5H-[1]benzopyrano[3,4-c]piperidine.

(J) 3 - [2 - (4 - methylphenyl)ethyl] - 8 - hydroxy-5,5,10-trimethyl-5H-[1]benzopyrano[3,4-c]piperidine.

(K) 3 - [3 - (3,4 - dimethoxyphenyl)propyl] - 8 - hydroxy - 5,5,10 - trimethyl - 5H - [1]benzopyrano[3,4 - c]piperidine.

(L) 3 - [1 - (2,4,6 - tribromophenyl)ethyl] - 8 - hydroxy - 5,5,10 - trimethyl - 5H - [1]benzopyrano[3,4 - c]piperidine.

(M) 3 - [4 - (4 - nitrophenyl)butyl] - 8 - hydroxy-5,5,10-trimethyl-5H-[1]benzopyrano[3,4-c]piperidine.

(N) 3 - [2 - (4 - methylmercaptophenyl)ethyl] - 8 - hydroxy - 5,5,10 - trimethyl - 5H - [1]benzopyrano[3,4-c]piperidine.

(O) 3-{3-[1-(3,4 - methylenedioxyphenyl) - 1 - butenyl]}-8-hydroxy-5,5,10-trimethyl - 5H - [1]benzopyrano[3,4-c]piperidine.

(P) 3 - {3 - [1 - (4 - acetylaminophenyl) - 1 - butenyl]}-8 - hydroxy - 5,5,10 - trimethyl - 5H - [1]benzopyrano[3,4-c]piperidine.

(Q) 3 - {4 - [1 - (3 - trifluoromethylphenyl) - 1 - butenyl[} - 8 - hydroxy - 5,5,10 - trimethyl - 5H - [1]benzopyrano[3,4-c]piperidine.

(R) 3 - cyclopropylcarbonyl - 8 - hydroxy - 5,5,10 - trimethyl-5H-[1]benzopyrano[3,4-c]piperidine.

(S) 3 - cyclopropylmethyl - 8 - hydroxy - 5,5,10 - trimethyl-5H-[1]benzopyrano[3,4-c]piperidine.

(T) 3 - (3 - phenyl - 2 - propynyl) - 8 - hydroxy - 5,5,10-trimethyl-5H-[1]benzopyrano[3,4-c]piperidine.

(U) 3 - allyl - 8 - hydroxy - 5,5,10 - trimethyl - 5H-[1]benzopyrano[3,4-c]piperidine.

(V) 3 - (2 - propynyl) - 8 - hydroxy - 5,5,10 - trimethyl-5H-[1]benzopyrano[3,4-c]piperidine.

(W) 3 - (trans - 3 - chloroallyl) - 8 - hydroxy - 5,5,10-trimethyl-5H-[1]benzopyrano[3,4-c]piperidine.

(X) 8 - acetoxy - 3,5,5,10 - tetramethyl - 5H - [1]benzopyrano[3,4-c]piperidine.

(Y) 8 - methoxy - 3,5,5,10 - tetramethyl - 5H - [1]benzopyrano[3,4-c]piperidine.

(Z) 8 - carbamyloxy - 3,5,5,10 - tetramethyl - 5H - [1]benzopyrano[3,4-c]piperidine.

(AA) 8 - (N - methylcarbamyloxy) - 3,5,5,10 - tetramethyl-5H-[1]benzopyrano[3,4-c]piperidine.

(BB) 8 - (N,N - dimethylcarbamyloxy) - 3,5,5,10-tetramethyl-5H-[1]benzopyrano[3,4-c]piperidine.

(CC) 8 - phosphonyloxy - 3,5,5,10 - tetramethyl - 5H-[1]benzopyrano[3,4-c]piperidine.

We claim:
1. A compound having the formula

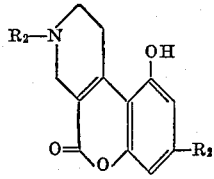

where $R_2$ is methyl or 3-methyl-2-octyl; and $R_3$ is lower-alkanoyl, cycloalkyl-lower-alkyl, cycloalkyl - lower-alkanoyl, lower-alkenyl, lower-alkynyl, halo - lower - alkenyl, phenyl-lower-alkyl, phenyl-lower-alkanoyl, phenyl-lower-alkenyl, or phenyl-lower-alkynyl, said cycloalkyl-lower-alkyl and cycloalkyl-lower-alkanoyl groups containing from three to eight ring carbon atoms in the cycloalkyl moiety.

2. A compound according to claim 1 where $R_3$ is phenyl-lower-alkyl.

3. A compound according to claim 1 where $R_3$ is lower-alkynyl.

4. 3-benzyl-10 - hydroxy-8-(3-methyl-2-octyl) - 5-oxo-1,2,3,4 - tetrahydro - 5H-[1]benzopyrano[3,4-c]pyridine according to claim 2 where $R_2$ is 3-methyl-2-octyl; and $R_3$ as phenyl-lower-alkyl is benzyl.

5. 3-benzyl-10 - hydroxy - 8 - methyl-5 - oxo - 1,2,3,4-tetrahydro - 5H - [1]benzopyrano[3,4-c]pyridine according to claim 2 where $R_2$ is methyl; and $R_3$ as phenyl-lower-alkyl is benzyl.

6. 10-hydroxy-8-methyl-5-oxo-3 - (2-propynyl)-1,2,3,4-tetrahydro - 5H-[1]benzopyrano[3,4-c]pyridine according to claim 3 where $R_2$ is methyl; and $R_3$ as lower-alkynyl is 2-propynyl.

7. 10 - hydroxy - 8 - (3 - methyl - 2-octyl)-5-oxo-3-(2-propynyl) - 1,2,3,4 - tetrahydro-5H-[1]benzopyrano[3,4-c]pyridine according to claim 3 where $R_2$ is 3-methyl-2-octyl; and $R_3$ as lower-alkynyl is 2-propynyl.

References Cited
UNITED STATES PATENTS 3,429,889   2/1969   Shulgin _____ 260—295

OTHER REFERENCES

Fieser & Fieser, Advanced Organic Chemistry, Reinhold, pp. 495–6 (1961).

HENRY R. JILES, Primary Examiner

A. L. ROTMAN, Assistant Examiner

U.S. Cl. X.R.

260—294, 294.3, 294.7, 297; 424—266, 267

UNITED STATES PATENT OFFICE
CERTIFICATE OF CORRECTION

Patent No. 3,514,464　　　　　　　　　　　　　　　　　　May 26, 1970

Harry G. Pars et al.

It is certified that error appears in the above identified patent and that said Letters Patent are hereby corrected as shown below:

Column 21, the formula in claim 1, should appear as shown below:

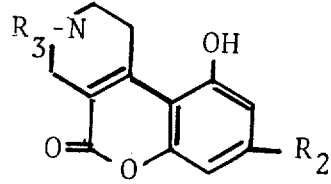

Signed and sealed this 23rd day of February 1971.

(SEAL)
Attest:

Edward M. Fletcher, Jr.
Attesting Officer

WILLIAM E. SCHUYLER, JR.
Commissioner of Patents